United States Patent
Castinado et al.

(10) Patent No.: US 10,958,626 B2
(45) Date of Patent: Mar. 23, 2021

(54) END TO END ENCRYPTION ON A NETWORK WITHOUT USING CERTIFICATES

(71) Applicant: BANK OF AMERICA CORPORATION, Charlotte, NC (US)

(72) Inventors: Joseph Benjamin Castinado, North Glenn, CO (US); Charles Russell Kendall, Snoqualmie, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 293 days.

(21) Appl. No.: 16/045,210

(22) Filed: Jul. 25, 2018

(65) Prior Publication Data
US 2020/0036688 A1    Jan. 30, 2020

(51) Int. Cl.
| | |
|---|---|
| *H04L 9/08* | (2006.01) |
| *H04L 29/06* | (2006.01) |
| *H04L 9/32* | (2006.01) |
| *H04L 9/14* | (2006.01) |

(52) U.S. Cl.
CPC ........ *H04L 63/0428* (2013.01); *H04L 9/0852* (2013.01); *H04L 9/14* (2013.01); *H04L 9/3263* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 7,697,693 | B1 * | 4/2010 | Elliott | H04B 10/70 380/278 |
| 10,218,494 | B1 * | 2/2019 | de Quehen | H04L 9/3247 |
| 2011/0064222 | A1 * | 3/2011 | Wiseman | H04L 9/0827 380/255 |
| 2015/0055961 | A1 * | 2/2015 | Meyers | H04B 10/70 398/140 |
| 2018/0054304 | A1 * | 2/2018 | Tanizawa | H04L 9/0852 |
| 2019/0097792 | A1 * | 3/2019 | Howe | H04L 1/0045 |
| 2019/0103962 | A1 * | 4/2019 | Howe | H04L 63/062 |

FOREIGN PATENT DOCUMENTS

DE    102016109828 A1 * 12/2017

* cited by examiner

*Primary Examiner* — Eleni A Shiferaw
*Assistant Examiner* — Bassam A Noaman
(74) *Attorney, Agent, or Firm* — Michael A. Springs; Moore & Van Allen PLLC; Nicholas C. Russell (57) ABSTRACT

Embodiments of the invention are directed to systems, methods and computer program products for end to end encryption on a network without using certificates. The system utilizes a correlation between two quantum particles that are entangled. In this way, data may be encrypted with the particles and transmitted to end users. Since the particles are forced to behave the same way even if they are separated, the data associated with the particles is not able to be breached. In the application encryption processing, that means the particles are not hackable and the encryption is always true and accurate. In this way, verification of application encryption occurs via particle measurement by leveraging the fact that that there is only one sender and one receiver, because they are of the same particle computation or physical end-point, instead of current encryption relying on logical end-points.

17 Claims, 6 Drawing Sheets

Figure 6

US 10,958,626 B2

END TO END ENCRYPTION ON A NETWORK WITHOUT USING CERTIFICATES

BACKGROUND

Currently, encryption bounds data points in a handshake, such as with a token and key. Unfortunately, these handshakes can be hacked and broken. With advancements in technology, end to end encryption can be more secure.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention perform end to end encryptions within a network without using certificates. Particle entanglement theories have been proven to exist. In this way, when two particles are tied together, the two particles are always bound together. In an applied way to use this within an application encryption processes, the system bounds two particles together, which are now bound and unbreakable. In the application encryption processing, that means the particles are not hackable and the encryption is always true and accurate. Currently, encryption bounds data points in a handshake, such as with a token and key. Unfortunately, these handshakes can be hacked and broken. The system creates an unbreakable encryption based on particles instead of encryption based on logic, certificate, algorithms, or the like. In this way, we are now able to verify via particle analysis by leveraging the fact that that there is only one sender and one receiver, because they are of the same particle computation or physical end-point, instead of current encryption relying on logical end-points. An analogy is that a coin only has a physical heads and a tail (only two sides to a coin). The idea of particle analysis is that there is only a Point A and a Point B.

Embodiments of the invention relate to systems, methods, and computer program products for end to end encryption, the invention comprising: transmitting encrypted data to an end point, wherein the transmission does not include a certificate or encryption key; identifying, via the quantum optimizer, a pair of entangled particles, wherein the pair of entangled particles includes a source particle and a destination particle; encoding the source particle and the destination particle; sending the destination particle to the end point that received the transmitted encrypted data; performing measurements on the source particle to cause measurements at the destination particle; and performing decryption of the encrypted data based on the measurements received at the destination particle, wherein the measurements encoded an encryption certificate or encryption key for accessing the encrypted data.

In some embodiments, encoding the source particle and the destination particle further comprises providing the end point with a cypher of one or more measurements of the destination particle, wherein measurement of the destination particle corresponds to a binary code combination that encodes the encryption certificate or encryption key for accessing the encrypted data.

In some embodiments, encoding the source particle and the destination particle further comprises encoding one or more qubits within a state of the pair of entangled particles, wherein the encoded one or more qubits encodes the encryption certificate or encryption key for accessing the encrypted data.

In some embodiments, measurements comprise manipulation a state of a particle including a rotation, spin, polarization, and/or energy state of the particle.

In some embodiments, the end point is an entity receiving encrypted data comprising financial data.

In some embodiments, the pair of entangled particles are quantum particles separated at a source location and a destination location that act as a whole based on entanglement, wherein acting as a whole comprises performing measurements on the source particle causes a reaction on the destination particle.

In some embodiments, a classical computer apparatus is further configured to access and visualize the encrypted data after the measurement encoded the encryption certificate or encryption key for accessing the encrypted data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account resource transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading resource onto stored value cards (SVCs) and/or prepaid cards; donating to charities; and/or the like.

In some embodiments, an "entity" may be a financial institution. For the purposes of this invention, a "financial institution" may be defined as any organization, entity, or the like in the business of moving, investing, or lending resources, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself. In some embodiments, the "user" may be a customer (e.g., an account holder) or an individual completing a transaction.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207, 672, each of which is incorporated herein by reference in its entirety.

Current end to end encryption applications use certificates to encode messages or information in such a way that only authorized parties can access the information and those who are not authorized cannot access the information. Current encryption does not itself prevent interference, but does deny the intelligible content of the data to a would be interceptor. Data is typically encrypted via certificates using an encryption algorithm. I cipher may allow the recipient of the data to decrypt the data and gain access thereto. Currently, misappropriation may occur and it is possible to decrypt the encrypted data without possessing the key, but, for a well-designed encryption scheme, considerable computational resources and skills are required. An authorized recipient can easily decrypt the message with the key provided by the originator to recipients but not to unauthorized users.

Embodiments of the invention perform end to end encryptions within a network without using certificates. The system utilizes a correlation between two quantum particles that are entangled. In this way, the two particles are forced to behave the same way even if they are separated. The two particles are applied to the transmission of data within an application encryption processes. In the application encryption processing, that means the particles are not hackable and the encryption is always true and accurate. Currently, encryption bounds data points in a handshake, such as with a token and key. Unfortunately, these handshakes can be hacked and broken. The system creates an unbreakable encryption based on particles instead of encryption based on logic, certificate, algorithms, or the like. In this way, we are now able to verify via particle analysis by leveraging the fact that that there is only one sender and one receiver, because they are of the same particle computation or physical end-point, instead of current encryption relying on logical end-points.

Figure 1:
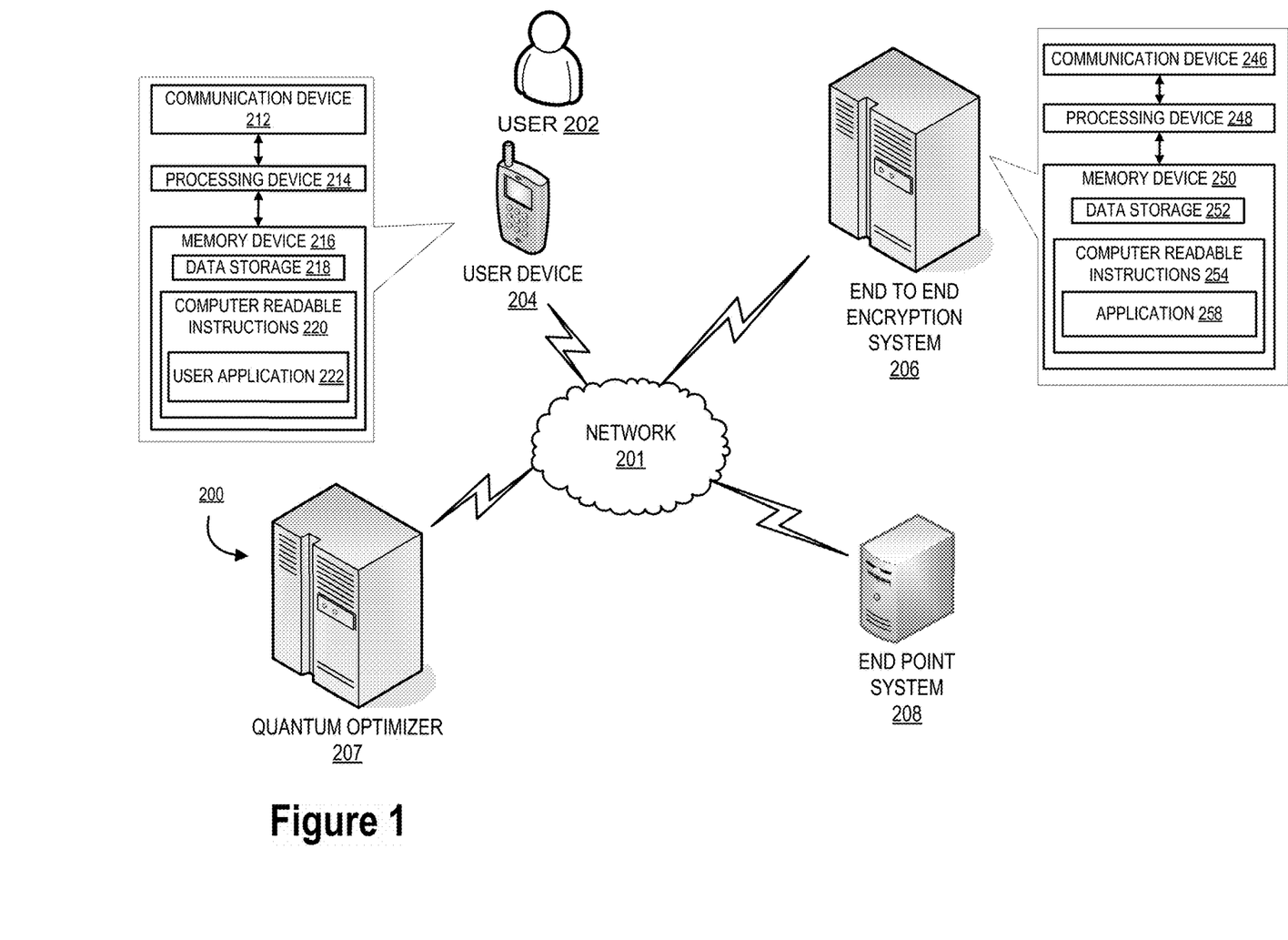
FIG. 1 illustrates an end to end encryption system environment, in accordance with embodiments of the present invention.

FIG. 1 illustrates an end to end encryption system environment 200, in accordance with embodiments of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of end to end encryption on a network via quantum particle tagging.

As illustrated in FIG. 1, the end point system 208 is operatively coupled, via a network 201 to the user device 204, quantum optimizer 207, and to the end to end encryption system 206. In this way, the end point system 208 can send information to and receive information from the user device 204, quantum optimizer 207, and the end to end encryption system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that may be encrypting data via an application for transmission of the data. In other embodiments, the user 202 may be an individual receiving encrypted data via an application.

FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the end to end encryption system 206, the end point system 208, and the quantum optimizer 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

As further illustrated in FIG. 1, the end to end encryption system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the end point system 208, the quantum optimizer 207, and the user device 204. As such, the communication device 246 generally comprises a modem, server, or other device for communicating with other devices on the network 201.

As further illustrated in FIG. 1, the end to end encryption system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the end to end encryption system 206 the memory device 250 stores an application 258. Furthermore, the end to end encryption system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more end point system 208, quantum optimizer 207, and/or user device 204.

In some embodiments, the end to end encryption system 206 via the application may communicate with the quantum optimizer 207 to allow for quantum processing of data. As such, the application 258 may manipulate standard computer data and triggers a communication of that data to a quantum optimizer 207 for required quantum analytics. The application 258 then manipulates the data for subsequent conversion to general computer coding. The application 258 may store the qubits and utilizes the quantum optimizer 207 for analytics and tracking when necessary.

As illustrated in FIG. 1, the quantum optimizer 207 is connected to at least the end to end encryption system 206.

The quantum optimizer is described in more detail below with respect to FIG. 2. The quantum optimizer 207 may be associated with one or more entities. In this way, the quantum optimizer 207 may be associated with a third party, a financial institution, or the like.

As illustrated in FIG. 1, the end point system 208 is connected to the quantum optimizer 207, user device 204, and end to end encryption system 206. In some embodiments, the end point system 208 may be a third party system separate from the end to end encryption system 206. The end point system 208 has the same or similar components as described above with respect to the user device 204 and the end to end encryption system 206. While only one end point system 208 is illustrated in FIG. 1, it is understood that multiple end point system 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The end point system 208 may generally include a processing device communicably coupled to devices as a memory device, output devices, input devices, a network interface, a power source, one or more chips, and the like. The end point system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the end point system 208 described herein.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the invention perform end to end encryptions within a network without using certificates. The system utilizes a correlation between two quantum particles that are entangled. In this way, the two particles are forced to behave the same way even if they are separated. The two particles are applied to the transmission of data within an application encryption processes. In the application encryption processing, that means the particles are not hackable and the encryption is always true and accurate. Currently, encryption bounds data points in a handshake, such as with a token and key. Unfortunately, these handshakes can be hacked and broken. The system creates an unbreakable encryption based on particles instead of encryption based on logic, certificate, algorithms, or the like. In this way, we are now able to verify via particle analysis by leveraging the fact that that there is only one sender and one receiver, because they are of the same particle computation or physical end-point, instead of current encryption relying on logical end-points.

Figure 2:
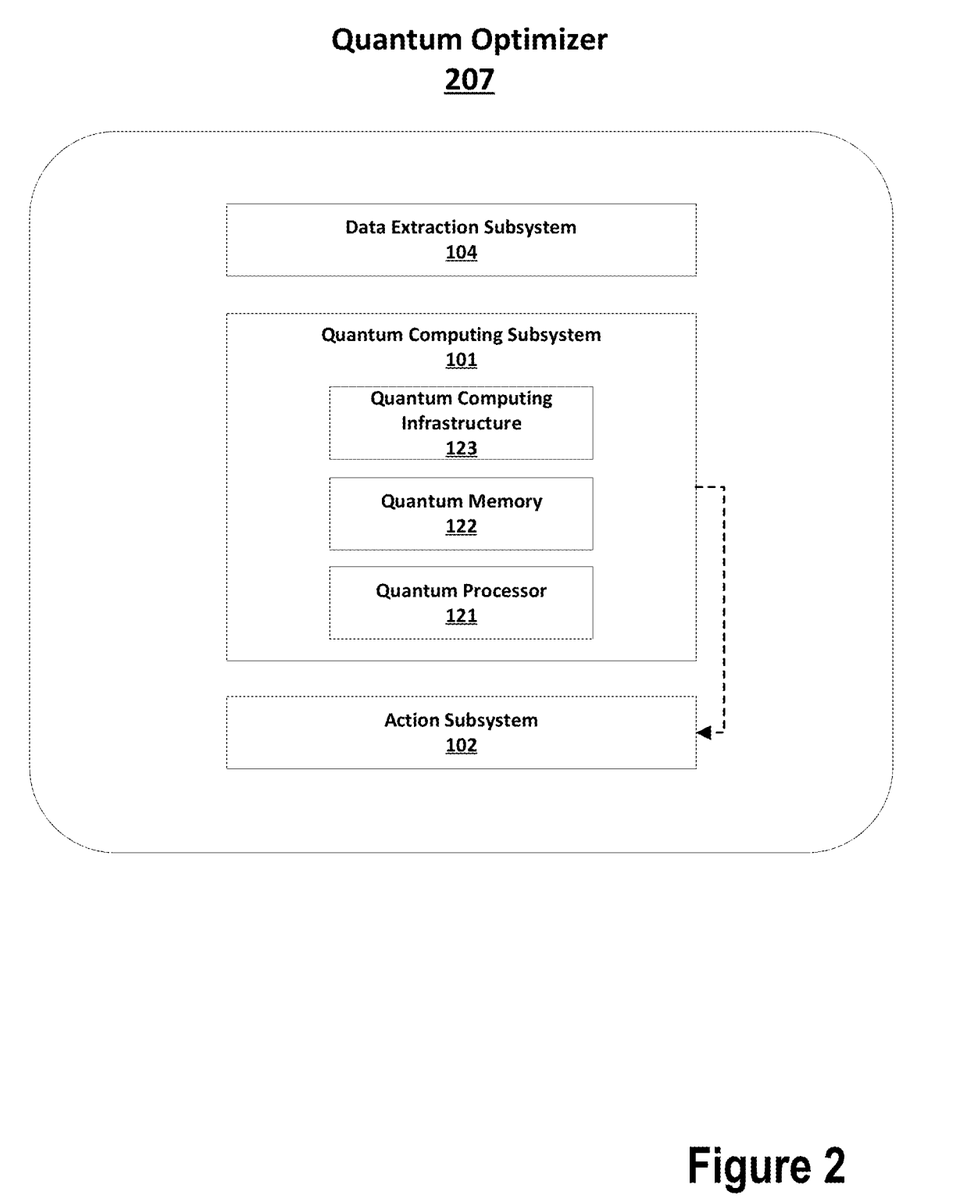
FIG. 2 is a diagram of a quantum optimizer, in accordance with embodiments of the present invention.

FIG. 2 is a schematic diagram of an exemplary quantum optimizer 207 that can be used in parallel with a classical computer to solve optimization problems. The quantum optimizer 207 is comprised of a data extraction subsystem 104, a quantum computing subsystem 101, and an action subsystem 102. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the data extraction subsystem 104 communicates with the network to extract data for optimization. It will be understood that any method of communication between the data extraction subsystem 104 and the network is satisfactory sufficient, including but not limited to wired communication, radiofrequency (RF) communication, Bluetooth, WiFi, and the like. The data extraction subsystem 104 then formats the data for optimization in the quantum computing subsystem.

As further depicted in FIG. 2, the quantum computing subsystem 101 comprises a quantum computing infrastructure 123, a quantum memory 122, and a quantum processor 121. The quantum computing infrastructure 123 comprises physical components for housing the quantum processor 121 and the quantum memory 122. The quantum computer infrastructure 123 further comprises a cryogenic refrigeration system to keep the quantum computing subsystem 101 at the desired operating temperatures. In general, the quantum processor 121 is designed to perform adiabatic quantum computation and/or quantum annealing to optimize data received from the data extraction subsystem 104. The quantum memory 122 is comprised of a plurality of qubits used for storing data during operation of the quantum computing subsystem 101. In general, qubits are any two-state quantum mechanical system. It will be understood that the quantum memory 122 may be comprised of any such two-state quantum mechanical system or particle, such as the polarization of a single photon, the spin of an electron, and the like.

The action subsystem 102 communicates the optimized data from the quantum computing subsystem 101 over the network. It will be understood that any method of communication between the data extraction subsystem 104 and the network is satisfactory, including but not limited to wired communication, radiofrequency (RF) communication, Bluetooth, WiFi, and the like.

Figure 3:
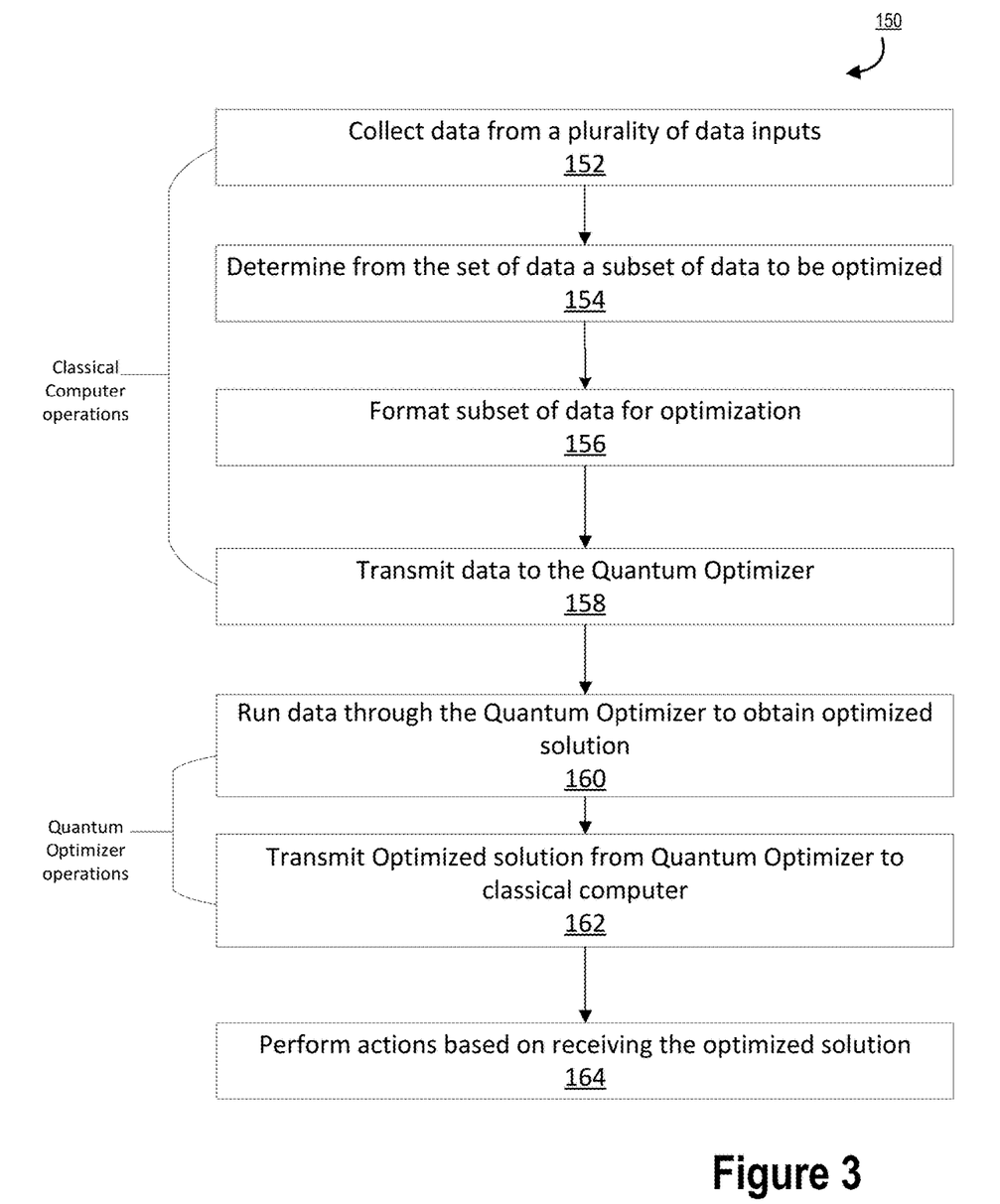
FIG. 3 is a flowchart illustrating the utilization of quantum computer within a lineage identification framework, in accordance with embodiments of the present invention.

FIG. 3 is a high level process flow of utilization of quantum computer within a lineage identification framework 150, in accordance with some embodiments of the invention. As depicted in FIG. 3, a classical computer begins the process at step 152 by collecting data from a plurality of inputs. At step 154, the classical computer then determines from the set of data collected at step 152 a subset a data to be optimized. The classical computer then formats the subset of data for optimization at step 156. At step 158, the classical computer transmits the formatted subset of data to the quantum optimizer. The quantum optimizer runs the data to obtain the optimized solution at 160. The quantum optimizer then transmits the optimized data back to the classical computer at step 162. Finally, the classical computer can perform actions based on receiving the optimized solution at step 164.

In quantum computing, entangled particles remain connected so that actions performed on one affect the other, even when separated by great distances. The rules of quantum physics state that an unobserved photon exists in all possible states simultaneously but, when observed or measured, exhibits only one state. Entanglement occurs when a pair of particles, such as photons, interact physically.

Figure 4:
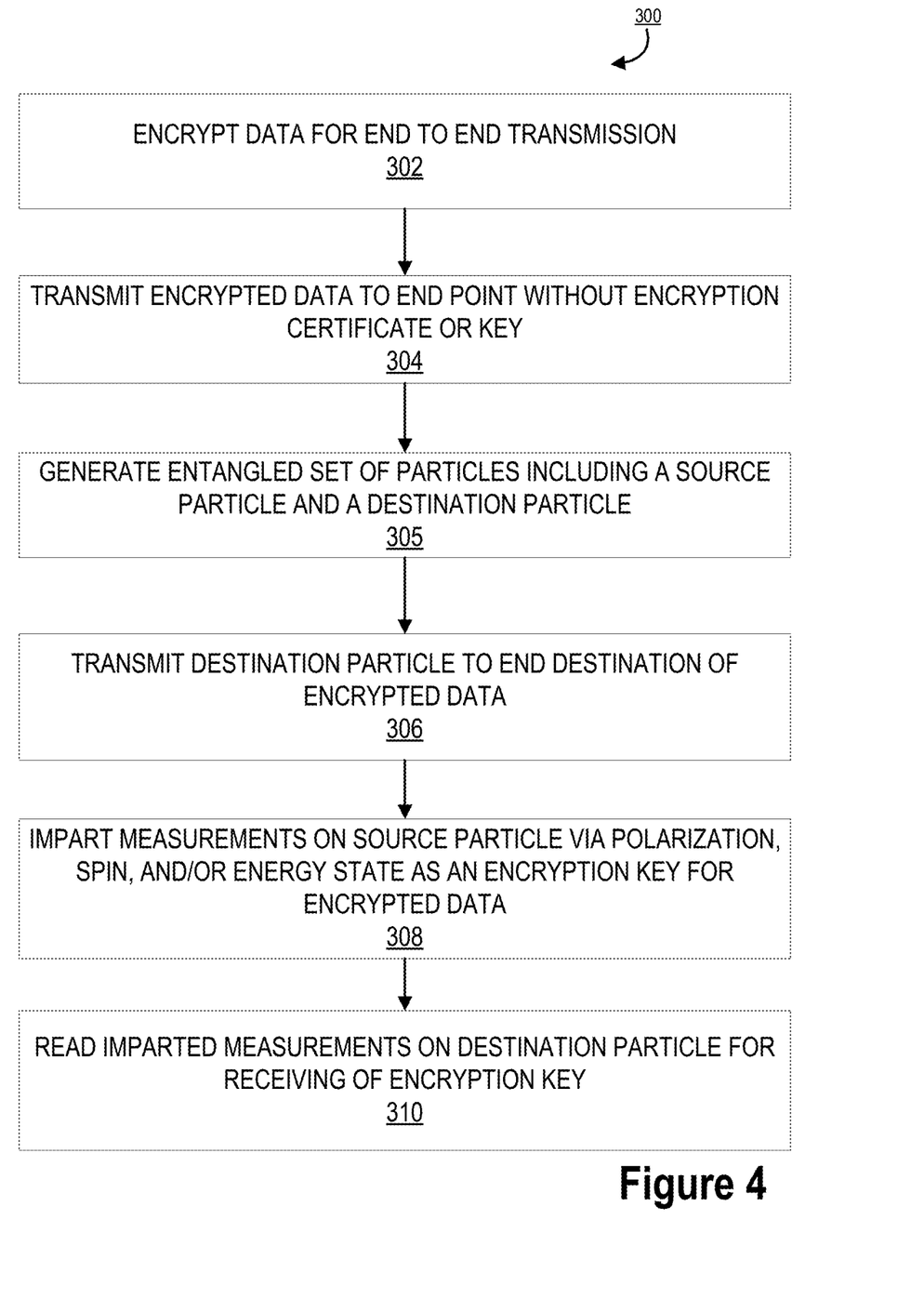
FIG. 4 is a flowchart illustrating end to end encryption on a network without using certificates, in accordance with embodiments of the present invention.

FIG. 4 illustrates end to end encryption on a network without using certificates 300, in accordance with embodiments of the present invention. As illustrated in block 302, the process 300 is initiated by encrypting data for end to end transmission. In this way, the data may comprise personal information, transactional information, financial information, or the like that may be required to transmit from one entity or server to another for processing of the data. The data may be encrypted via standard encryption means. However, no encryption key or certification may be transmitted with the data. In some embodiments, no key or certificate may ever be transmitted.

As illustrated in block 304, the process 300 continues by transmission of the encrypted data to the end point without the encryption key or certificate. As such, encrypted data is transmitted to an end point entity. During transmission, while misappropriation of the data could occur via the transmission, no encryption key or certificate is transmitted with the data. As such, the data is not able to be visualized or functional to any misappropriations.

Next, as illustrated in block 305, the process 300 continues by generating entangled sets of quantum particles that include a source particle and a destination particle. An entangled system is defined to be one whose quantum state cannot be factored as a product of states of its local constituents. As such, the two particles are no longer individual, but instead act as one. Quantum particles can become entangled through various types of interactions. The entangled state particles are generated via the quantum optimizer. In some embodiments, particles become entangled by one or more of the Einstein-Podolsky-Rosen (EPR) and Greenberger-Horne-Zeilinger (GHZ) effects.

In some embodiments, if the pair of entangled particles are positioned at different locations, such as an origination location and an end point and measurement is applied to the particle, for example, spin then measure the other particle using the same criterion (spin along the same axis), will match, in complementation.

In this way, as illustrated in block 306, once the entangled particles have been generated, the system may transmit one of the particles, the destination particle, to the end destination of the encrypted data.

Upon transmission of the destination particle to the end destination of the encrypted data, the system may impart measurements on the source particle to provide the encryption key for the encrypted data, as illustrated in block 308. In this way, at the source particle, the system may deploy measurements on that particle. These measurements may be changes in polarization, spin direction, spin rate, and/or energy state of the particle. Based on the source particle and destination particle being an entangled pair of particles, the destination particle may react in the same or comparative manner as the source particle when the measurement was applied to the source particle.

Next, as illustrated in block 310, the process 300 is completed by the end destination system reading the imparted measurements on the destination particle to reveal the encryption key. In this way, the measurements may correspond to binary code or quantum qubits that code into the key for the encrypted data. As such, upon applying the code received from the measurements to the data, the end destination may access the encrypted data.

Figure 5:
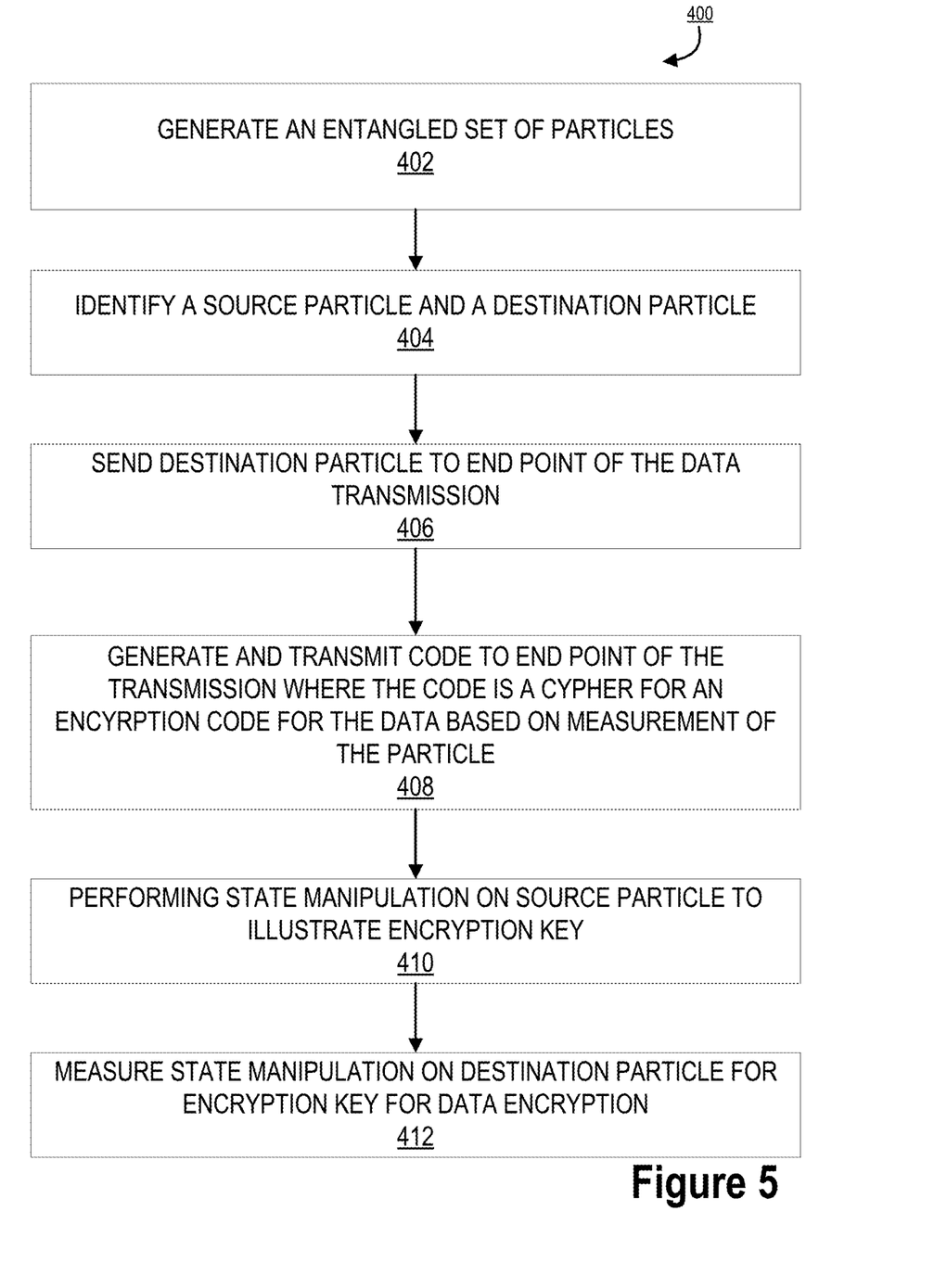
FIG. 5 is a flowchart illustrating end to end encryption via particle measurement, in accordance with embodiments of the present invention.

FIG. 5 is a flowchart illustrating end to end encryption via particle measurement, in accordance with embodiments of the present invention 400. As illustrated in block 402, the process 400 is initiated by generating an entangled set of particles. In some embodiments, the quantum optimizer may generate the entangled particles. In some embodiments, the entangled particles may be generated by a third party. Quantum entanglement is a physical phenomenon which occurs when pairs or groups of particles are generated such that the state of the source and destination particle are not independent but are considered to be one or a whole. Measurement of the physical properties, including polarization, spin, and/or energy state performed on the source particle may be found to be correlated to the same measurement on the destination particle.

Once the particle set has been identified, the system may determine a source particle and a destination particle, as illustrated in block 404. Once the source particle and destination particle are determined, the system may send the destination particle to the end point of the data transmission, as illustrated in block 406. In this way, the entity receiving the encrypted data may receive the destination particle. The entity may be a financial institution or other entity receiving account information, financial information, or other personal information in the encrypted data packet that was transmitted to the entity prior to the particle being sent.

As illustrated in block 408, the process 400 continues by generating and transmitting a code to the end point of the transmission wherein the code is a cypher for an encryption code for the data based on measurement of the particle. The code may include a cypher for each measurement of the particle, such as rotation, energy state, and/or polarization. In this way, the cypher may reveal a code for the certificate or key for the encrypted data. For example, rotation A of the particle may correspond to a binary code point. The system may then build the binary code from the various measurements from the destination particle. The built code may then be the encryption key for the data provided to the end destination.

Next, as illustrated in block 410, the process 400 continues by performing state manipulations on the source particle to illustrate the cyphered encryption key. In this way, the system may manipulate the state of the source particle via measurement such as rotation, polarization, and/or energy state. Since the source particle and the destination particle are entangled, the measurement on the source particle may be performed on the destination particle. As such, the system may communicate the encryption key via the measurements performed on the source particle to the destination without any transmission. As such, there is no way the encryption key is misappropriated and will always remain secure. In this way, as illustrated in block 412, the process 400 is complete by measuring the state manipulations on the destination particle for encryption key cyphering for the data decryption.

Figure 6:
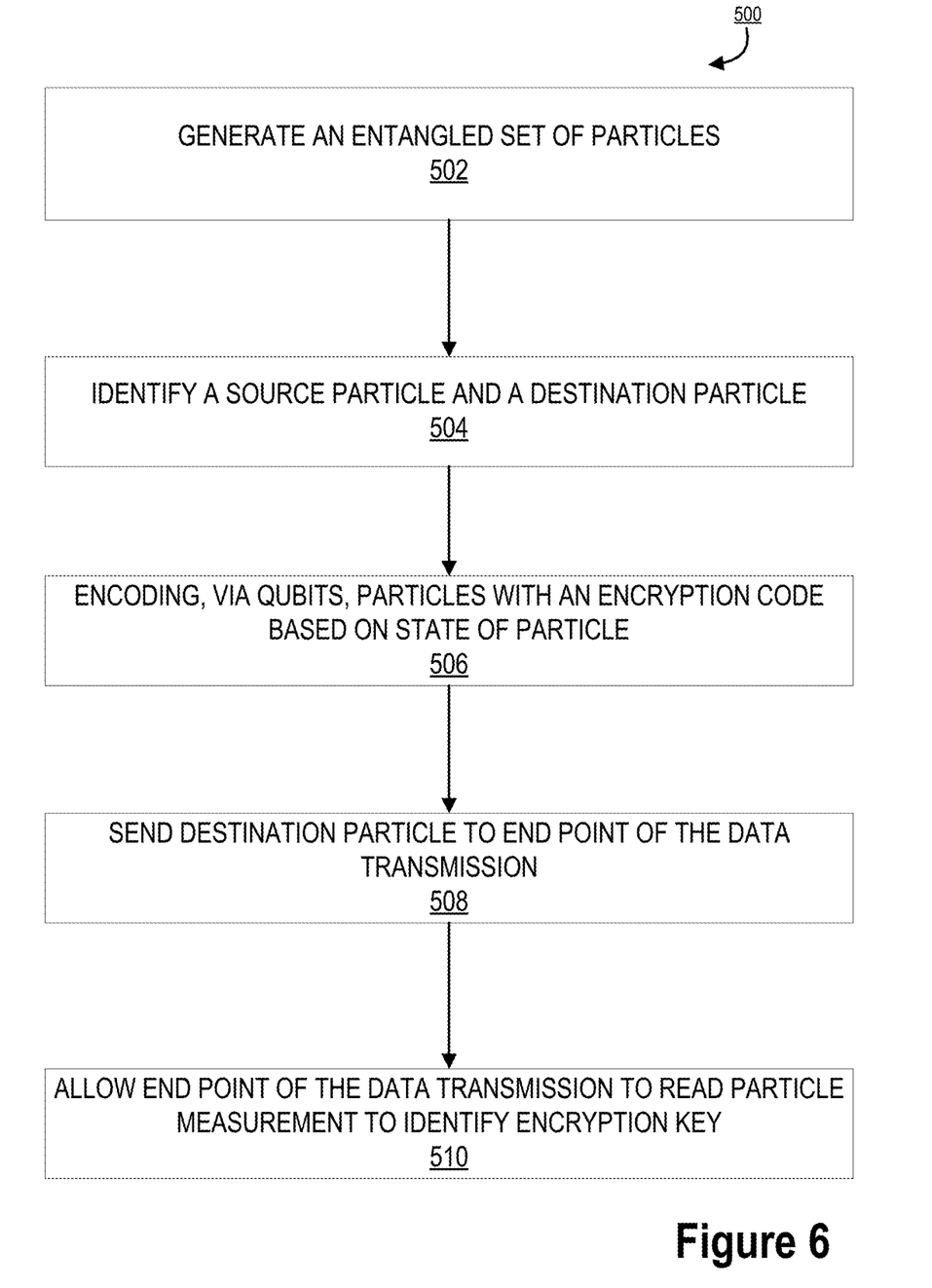
FIG. 6 is a flowchart illustrating generation and transmission of qubit encryption key for encryption, in accordance with embodiments of the present invention.

FIG. 6 illustrates a flowchart for the generation and transmission of qubit encryption key for encryption 500, in accordance with embodiments of the present invention. As illustrated in block 502, the process 500 is initiated by generating an entangled set of particles. In some embodiments, the quantum optimizer may generate the entangled particles. In some embodiments, the entangled particles may be generated by a third party. Quantum entanglement is a physical phenomenon which occurs when pairs or groups of particles are generated such that the state of the source and destination particle are not independent but are considered to be one or a whole. Measurement of the physical properties, including polarization, spin, and/or energy state performed on the source particle may be found to be correlated to the same measurement on the destination particle.

Once the particle set has been identified, the system may determine a source particle and a destination particle, as illustrated in block 504. The particles, via measurement, may be encoded via qubit, with an encryption code based on the state of the particle, as illustrated in block 506. In this way, the state of the particle may be modified to include or encode for the encryption key or certificate for the encrypted data. Once encoded, the system may send the destination particle to the end point of the encrypted data transmission, as illustrated in block 508. In this way, the entity receiving the encrypted data may receive the destination particle. The entity may be a financial institution or other entity receiving account information, financial information, or other personal information in the encrypted data packet that was transmitted to the entity prior to the particle being sent.

Next, as illustrated in block 510, the process 500 is completed by allowing the end point user who received the encrypted data transmission to read the particle measurement to identify the encryption key and unlock the data for access.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for end to end encryption, the system comprising: a classical computer apparatus comprising: a processor; a memory; and a quantum optimizer in communication with the classical computer apparatus, the quantum optimizer comprising: a quantum processor; and a quantum memory; wherein the system is configured for: transmitting encrypted data to an end point, wherein the transmission does not include a certificate or encryption key, wherein no key or certificate is ever transmitted; identifying, via the quantum optimizer, a pair of entangled particles, wherein the pair of entangled particles includes a source particle and a destination particle; encoding the source particle and the destination particle, wherein encoding the source particle and the destination particle comprises providing the end point with a cypher of measurements of the destination particle, wherein measurement of the destination particle corresponds to a binary code combination that encodes the encryption certificate or encryption key for accessing the encrypted data; sending the destination particle to the end point that received the transmitted encrypted data; imparting measurements on the source particle, including a change in spin rate and energy state of the source particle; identifying a reaction to the imparted measurements on the destination particle based on the entangled property of the source particle and the destination particle; reading the reaction to the imparted measurements on the destination particle at a destination system; and revealing an encryption key for accessing the encrypted data based on performing decryption of the encrypted data based on the measurements received at the destination particle.

2. The system of claim 1, wherein encoding the source particle and the destination particle further comprises encoding one or more qubits within a state of the pair of entangled particles, wherein the encoded one or more qubits encodes the encryption certificate or encryption key for accessing the encrypted data.

3. The system of claim 1, wherein measurements comprise manipulation a state of a particle including a rotation, spin, polarization, and/or energy state of the particle.

4. The system of claim 1, wherein the end point is an entity receiving encrypted data comprising financial data.

5. The system of claim 1, wherein the pair of entangled particles are quantum particles separated at a source location and a destination location that act as a whole based on entanglement, wherein acting as a whole comprises performing measurements on the source particle causes a reaction on the destination particle.

6. The system of claim 1, wherein the classical computer apparatus is further configured to access and visualize the encrypted data after the measurement encoded the encryption certificate or encryption key for accessing the encrypted data.

7. A computer-implemented method for end to end encryption, the method comprising: providing a classical computer system comprising a computer processing device and a non-transitory computer readable medium, where the computer readable medium comprises configured computer program instruction code, such that when said instruction code is operated by said computer processing device, said computer processing device performs the following operations: transmitting encrypted data to an end point, wherein the transmission does not include a certificate or encryption key, wherein no key or certificate is ever transmitted; identifying, via a quantum optimizer, a pair of entangled particles, wherein the pair of entangled particles includes a source particle and a destination particle; encoding the source particle and the destination particle, wherein encoding the source particle and the destination particle comprises providing the end point with a cypher of measurements of the destination particle, wherein measurement of the destination particle corresponds to a binary code combination that encodes the encryption certificate or encryption key for accessing the encrypted data; sending the destination particle to the end point that received the transmitted encrypted data; imparting measurements on the source particle, including a change in spin rate and energy state of the source particle; identifying a reaction to the imparted measurements on the destination particle based on the entangled property of the source particle and the destination particle; reading the reaction to the imparted measurements on the destination particle at a destination system; and revealing an encryption key for accessing the encrypted data based on performing decryption of the encrypted data based on the measurements received at the destination particle.

8. The computer-implemented method of claim 7, wherein encoding the source particle and the destination particle further comprises encoding one or more qubits within a state of the pair of entangled particles, wherein the encoded one or more qubits encodes the encryption certificate or encryption key for accessing the encrypted data.

9. The computer-implemented method of claim 7, wherein measurements comprise manipulation a state of a particle including a rotation, spin, polarization, and/or energy state of the particle.

10. The computer-implemented method of claim 7, wherein the end point is an entity receiving encrypted data comprising financial data.

11. The computer-implemented method of claim 7, wherein the pair of entangled particles are quantum particles separated at a source location and a destination location that act as a whole based on entanglement, wherein acting as a whole comprises performing measurements on the source particle causes a reaction on the destination particle.

12. The computer-implemented method of claim 7, wherein the classical computer apparatus is further configured to access and visualize the encrypted data after the measurement encoded the encryption certificate or encryption key for accessing the encrypted data.

13. A computer program product for end to end encryption, the computer program product comprising at least one non-transitory computer-readable medium having computer-readable program code portions embodied therein on a classical computer apparatus including a lineage application and a quantum optimizer in communication with the classical computer apparatus, wherein the computer program product is configured for: an executable portion configured for transmitting encrypted data to an end point, wherein the transmission does not include a certificate or encryption key, wherein no key or certificate is ever transmitted; an executable portion configured for identifying, via the quantum optimizer, a pair of entangled particles, wherein the pair of entangled particles includes a source particle and a destination particle; an executable portion configured for encoding the source particle and the destination particle, wherein encoding the source particle and the destination particle comprises providing the end point with a cypher of measurements of the destination particle, wherein measurement of the destination particle corresponds to a binary code combination that encodes the encryption certificate or encryption key for accessing the encrypted data; an executable portion configured for sending the destination particle to the end point that received the transmitted encrypted data; an executable portion configured for imparting measurements on the source particle, including a change in spin rate and energy state of the source particle; an executable portion configured for identifying a reaction to the imparted measurements on the destination particle based on the entangled property of the source particle and the destination particle; an executable portion configured for reading the reaction to the imparted measurements on the destination particle at a destination system; and an executable portion configured for revealing an encryption key for accessing the encrypted data based on performing decryption of the encrypted data based on the measurements received at the destination particle.

14. The computer program product of claim 13, wherein encoding the source particle and the destination particle further comprises encoding one or more qubits within a state of the pair of entangled particles, wherein the encoded one or more qubits encodes the encryption certificate or encryption key for accessing the encrypted data.

15. The computer program product of claim 13, wherein measurements comprise manipulation a state of a particle including a rotation, spin, polarization, and/or energy state of the particle.

16. The computer program product of claim 13, wherein the end point is an entity receiving encrypted data comprising financial data.

17. The computer program product of claim 13, wherein the pair of entangled particles are quantum particles separated at a source location and a destination location that act as a whole based on entanglement, wherein acting as a whole comprises performing measurements on the source particle causes a reaction on the destination particle.

* * * * *